(12) United States Patent
Kramer

(10) Patent No.: US 10,038,660 B2
(45) Date of Patent: *Jul. 31, 2018

(54) SYSTEM AND METHOD FOR REDUCING UNSOLICITED E-MAILS

(71) Applicant: Richard Kramer, Sharon, MA (US)

(72) Inventor: Richard Kramer, Sharon, MA (US)

(*) Notice: Subject to any disclaimer, the term of this patent is extended or adjusted under 35 U.S.C. 154(b) by 115 days.

This patent is subject to a terminal disclaimer.

(21) Appl. No.: 15/290,239

(22) Filed: Oct. 11, 2016

(65) Prior Publication Data

US 2017/0034093 A1  Feb. 2, 2017

Related U.S. Application Data

(63) Continuation of application No. 13/724,683, filed on Dec. 21, 2012, now Pat. No. 9,497,149.

(60) Provisional application No. 61/594,595, filed on Feb. 3, 2012.

(51) Int. Cl.
*H04L 12/58* (2006.01)

(52) U.S. Cl.
CPC .............. *H04L 51/12* (2013.01); *H04L 51/34* (2013.01)

(58) Field of Classification Search
CPC ................................. H04L 51/12; H04L 51/34
See application file for complete search history.

(56) References Cited

U.S. PATENT DOCUMENTS

| | | | | |
|---|---|---|---|---|
| 4,433,387 A * | 2/1984 | Dyer | ...................... | G01R 13/04 702/159 |
| 5,636,208 A * | 6/1997 | Chang | .................. | H04L 1/0057 370/347 |
| 6,266,692 B1 * | 7/2001 | Greenstein | ........... | G06Q 10/107 709/206 |
| 6,973,299 B2 | 12/2005 | Apfel | | |

(Continued)

FOREIGN PATENT DOCUMENTS

WO    WO 2006/051434    5/2006

OTHER PUBLICATIONS

Wikipedia, "Anti-Spam Techniques," 20 pages [http://en.wikipedia.org/wiki/Anti-spam_techniques].

*Primary Examiner* — Philip J Chea
*Assistant Examiner* — Wuji Chen
(74) *Attorney, Agent, or Firm* — Sunstein Kahn Murphy & Timbers LLP

(57) ABSTRACT

A method for reducing unsolicited e-mails includes receiving an e-mail message from a sender, storing the e-mail message within a holding unit, and sending a confirmation response request e-mail to the sender in response to the e-mail message from the sender. The confirmation response request e-mail may include a request for at least one confirmation code from the sender according to at least one calculation type/method specified in the confirmation response request e-mail. The method may also include receiving a confirmation e-mail from the sender in response to the confirmation response request e-mail, determining whether the confirmation e-mail includes a code correctly computed according the at least one confirmation code calculation type, and performing an action with respect to the e-mail message based upon the confirmation e-mail. The sender's support of the method creates an explicit agreement (Continued)

regarding legal jurisdiction governing any disputes arising out of the e-mail.

19 Claims, 1 Drawing Sheet

(56) References Cited

U.S. PATENT DOCUMENTS

| | | | |
|---|---|---|---|
| 7,149,778 B1* | 12/2006 | Patel | H04L 51/12 709/206 |
| 7,739,246 B2 | 6/2010 | Mooney et al. | |
| 8,046,832 B2 | 10/2011 | Goodman et al. | |
| 9,497,149 B2 | 11/2016 | Kramer | |
| 2003/0083917 A1 | 5/2003 | Tracey et al. | |
| 2003/0142111 A1* | 7/2003 | Emerson | G06F 3/1454 345/600 |
| 2003/0236847 A1* | 12/2003 | Benowitz | H04L 51/12 709/206 |
| 2004/0003283 A1* | 1/2004 | Goodman | G06Q 10/107 726/30 |
| 2005/0027716 A1 | 2/2005 | Apfel | |
| 2005/0159970 A1 | 7/2005 | Buyukkokten et al. | |
| 2005/0165584 A1 | 7/2005 | Boody et al. | |
| 2005/0165920 A1 | 7/2005 | Kerr et al. | |
| 2007/0038714 A1* | 2/2007 | Sell | H04L 51/34 709/206 |
| 2007/0150444 A1 | 6/2007 | Chesnais et al. | |
| 2007/0174432 A1 | 7/2007 | Rhee et al. | |
| 2007/0208941 A1 | 9/2007 | Backer | |
| 2007/0248040 A1* | 10/2007 | Huh | H04L 65/4061 370/328 |
| 2008/0155471 A1 | 6/2008 | Lynn et al. | |
| 2009/0029674 A1 | 1/2009 | Brezina et al. | |
| 2009/0031136 A1* | 1/2009 | Milliken | G06F 21/562 713/176 |
| 2009/0285204 A1* | 11/2009 | Gallant | G06Q 20/102 370/352 |
| 2010/0228560 A1 | 9/2010 | Balasaygun et al. | |
| 2010/0330972 A1 | 12/2010 | Angiolillo | |
| 2012/0063585 A1 | 3/2012 | Gravino et al. | |
| 2012/0066498 A1* | 3/2012 | Engert | G06F 21/51 713/170 |
| 2012/0150970 A1 | 6/2012 | Peterson et al. | |
| 2012/0254169 A1 | 10/2012 | Landsman et al. | |
| 2012/0331418 A1 | 12/2012 | Bonforte | |
| 2013/0166914 A1* | 6/2013 | Vandervort | H04L 9/3247 713/176 |

* cited by examiner

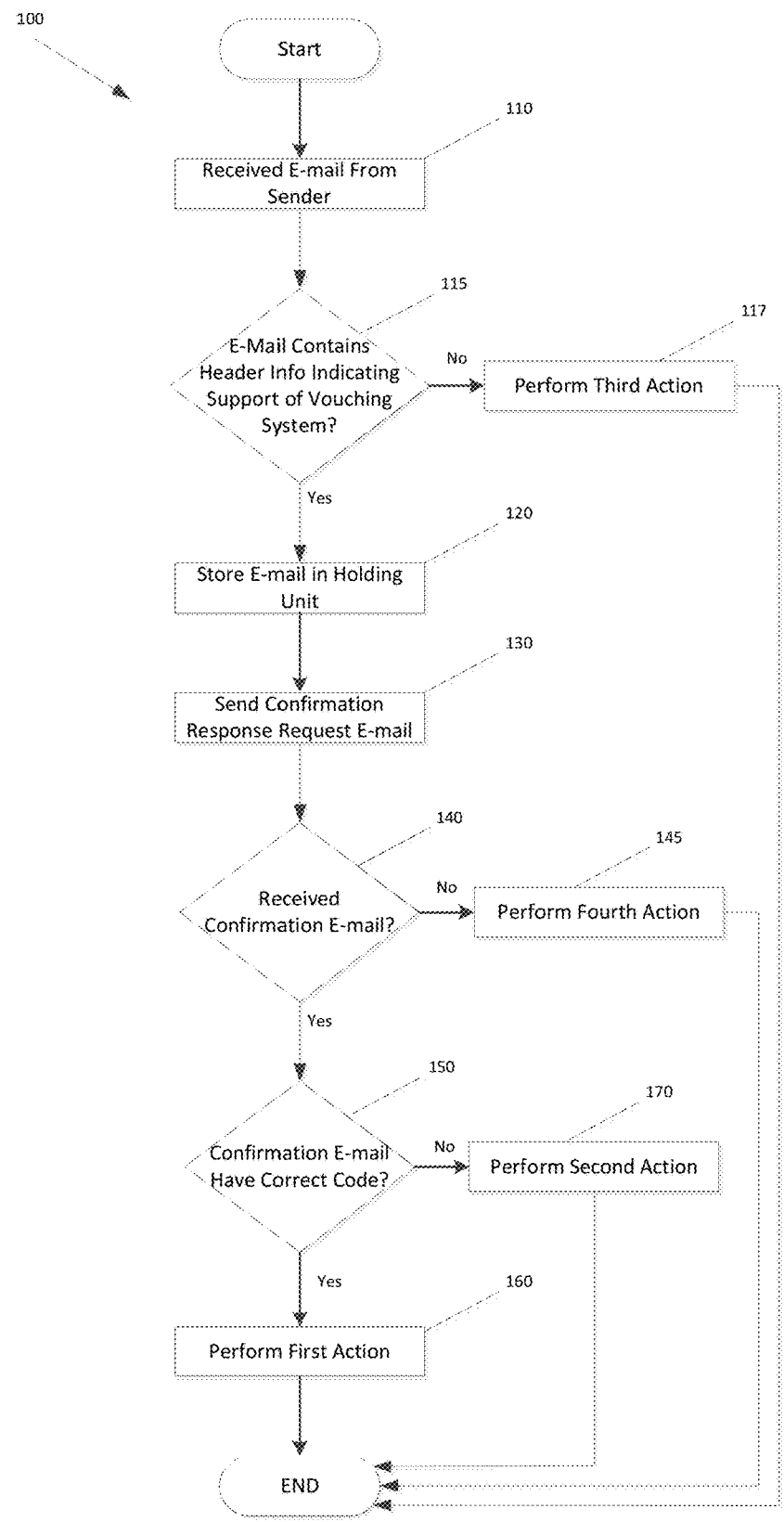

SYSTEM AND METHOD FOR REDUCING UNSOLICITED E-MAILS

PRIORITY

This patent application is a continuation of and claims priority from U.S. patent application Ser. No. 13/724,683, filed Dec. 21, 2012, entitled, "System and Method for Reducing Unsolicited E-Mails," and naming Richard Kramer as inventor, the disclosure of which is incorporated herein, in its entirety, by reference.

U.S. patent application Ser. No. 13/724,683, in turn, claims priority from U.S. Provisional Patent Application No. 61/594,595, filed Feb. 3, 2012, entitled, "System and Method for Reducing Unsolicited E-Mails," and naming Richard Kramer as inventor, the disclosure of which is incorporated herein, in its entirety, by reference.

TECHNICAL FIELD

The present invention relates to systems and methods for reducing unsolicited e-mails, and more particularly to requesting an e-mail message originator to confirm responsibility for sending an e-mail message to a recipient.

BACKGROUND ART

The near instantaneous speed and extremely low cost of email communications via the internet have truly revolutionized personal and business communications. As a result, access to and use of email is becoming nearly universal. Unfortunately, the large number of email users together with the extremely low cost of transmitting emails also facilitates the mass distribution of unwanted, unsolicited emails (spam) by parties unknown to the recipients of the emails. Spam is a problem because it unproductively consumes network resources and the recipients' computer resources. Spam e-mail also places a huge burden on recipients who are forced to sort through a high volume of spam in order to separate those emails which are wanted by the recipient from the unwanted spam. Even more serious is that fact that much spam is criminal in nature, transmitted by the sender for the explicit purposes of defrauding or victimizing the recipient, and/or invading the recipient's computer and/or computer network(s). Additionally, spam e-mails may contain harmful, malicious software, and/or can obtain proprietary information from the recipient or from the recipient's computer or computer network.

It is well documented that unwanted spam comprises the majority of email traffic over the internet. Software of various kinds is available to reduce the problems and risks caused by spam. In general, such software attempts to identify spam email (filtering) and/or examine the content of emails and email attachments for harmful or malicious content (screening). While such software is effective to some degree, it is costly, requires periodic attention or maintenance, is not 100% effective in detecting spam (false negatives), can erroneously block legitimate emails (false positives), and does not reduce the volume of spam traffic nor the demand on the recipients' network and computer resources.

Not only does spam cause costly and annoying operational problems, it is difficult for the recipient of spam to access legal remedies which are theoretically available. The main reason that legal remedies are difficult to access is that the matter of the applicable legal jurisdiction is difficult to document and establish.

Further exacerbating the spam problems is that fact that the internet is ad hoc in the sense that each user is free and responsible to decide how to access and use the internet and what operational policies, procedures and software to apply and use. While the underlying technical details such as communications protocols, are established by adopted standards, there are no such standards covering operational matters such as spam filtering or screening. One unfortunate result of this situation is that there are many minimally secured or completely unsecured computers connected to the internet (sometimes known as open relays) which are easily exploited by senders of spam (spammers) to greatly multiply their ability to rapidly flood the internet with high volumes of spam.

Another consequence of the ad hoc nature of the internet is that spammers can remain anonymous. They achieve anonymity by misrepresenting their identity when they originate the spam, or by fraudulently misrepresenting the spam sender when exploiting open relays to broadcast the spam. To date, various attempts to deny spammers anonymity such as Sender Policy Framework (SPF) have not be very successful.

SUMMARY OF THE EMBODIMENTS

In a first embodiment of the invention there is provided a method for reducing unsolicited e-mails. The method includes receiving at least one e-mail message from a sender to a recipient (e.g., addressee), and storing the at least one e-mail message within a holding unit (e.g., a holding database or other storage facility designated for that purpose). Each e-mail message includes a header indicating that the sender supports an e-mail vouching system. The method also includes sending a confirmation response request e-mail to the sender in response to each of the e-mail messages from the sender, and receiving a confirmation e-mail from the sender in response to the confirmation response request e-mail. The confirmation response request e-mail may include a request for at least one confirmation code from the sender as calculated by one or more confirmation code calculation methods specified within the confirmation response request e-mail.

After receiving the confirmation response, the method may determine whether the confirmation e-mail includes a code correctly computed according the one or more confirmation code calculation methods. If the confirmation e-mail includes the correctly calculated code, the method may perform a first action with respect to the e-mail message. If the confirmation e-mail does not include the correctly calculated code, the method may perform a second action with respect to the e-mail message. The first action may be pre-determined by the recipient, internet service provider (ISP) and/or the e-mail vouching system, and may include delivering the e-mail message to the recipient, transferring the e-mail message to filtering software, adding a confirmation e-mail result to the header, and/or notifying the recipient that the e-mail message is stored within the holding unit (e.g., a holding database or other storage facility designated for that purpose). The second action may also be pre-determined by the recipient, ISP, or e-mail vouching system and may include deleting the e-mail message, transferring the e-mail message to a filtering software, adding a confirmation e-mail result to the header, and/or notifying the recipient that the e-mail message is stored within the holding unit.

In accordance with some embodiments, the confirmation code calculation method(s) may include a null code, an 8 bit cyclic redundancy check, a 32 bit cyclic redundancy check, an 8 bit exclusive or redundancy check, and/or a 16 bit exclusive or redundancy check. The confirmation e-mail may include the code within the header information, and the confirmation e-mail header information may also include a message ID corresponding to the at least one e-mail message. The confirmation code calculation method may be performed with respect to the full content of the e-mail or with respect to a portion of the e-mail content as specified in the confirmation code request e-mail (e.g., the confirmation response request e-mail). The confirmation response request e-mail may include header information that indicates the e-mail vouching system is able to receive the confirmation e-mail.

In additional embodiments, the sender's support of the e-mail vouching system creates an explicit agreement regarding legal jurisdiction governing any disputes arising out of the e-mail. For example, the governing legal jurisdiction may be the legal jurisdiction of the recipient.

In accordance with further embodiments, the sender may perform an initial redundancy check on the e-mail message prior to sending the e-mail message to the recipient. The sender may store a sender initial redundancy check result in a sender look-up table. Additionally, the sender may perform a sender final redundancy check in response to the confirmation response request e-mail. The sender final redundancy check may create a sender final redundancy check result corresponding to the at least one confirmation code calculation method. Performing the final redundancy check may include performing the final redundancy check on at least part of the confirmation response request e-mail.

The e-mail recipient may perform an e-mail vouching system final redundancy check upon receiving or prior to receiving the confirmation e-mail, and store a e-mail vouching system final redundancy check result in a e-mail vouching system look-up table. Additionally, determining whether the confirmation e-mail includes the correctly computed code may include comparing the e-mail vouching system final redundancy check result within the e-mail vouching system look-up table with the code within the confirmation response. The confirmation response may include a cancel message if the sender would like the e-mail vouching system to cancel the e-mail message, and/or a deny message if the sender did not originate the e-mail message or wishes to deny that it originated the e-mail message.

In accordance with further embodiments, a method for reducing unsolicited e-mails may include receiving at least one e-mail message from a sender to a recipient, and storing the at least one e-mail message within a holding unit (e.g., a holding database or other storage facility designated for that purpose). Each e-mail message includes a header indicating that the sender supports an e-mail vouching system. The method also includes sending a confirmation response request e-mail to the sender in response to each of the e-mail messages from the sender, and receiving a confirmation e-mail from the sender in response to the confirmation response request e-mail. The confirmation response request e-mail may include a request for at least one confirmation code as calculated by one or more confirmation code calculation methods specified within the confirmation response request e-mail.

If a confirmation response is received, the method may determine whether the confirmation e-mail includes a code correctly computed according the one or more confirmation code calculation methods. If the confirmation e-mail includes the correctly calculated code, the method may perform a first action with respect to the e-mail message. If the confirmation e-mail does not include the correctly calculated code, the method may perform a second action with respect to the e-mail message. If a confirmation response is not received, the method may perform a third action with respect to the e-mail message.

BRIEF DESCRIPTION OF THE DRAWINGS

The foregoing features of embodiments will be more readily understood by reference to the following detailed description, taken with reference to the accompanying drawings, in which:

FIG. 1 shows a flowchart showing the steps of one method for reducing unsolicited e-mails, in accordance with some embodiments of the present invention.

DETAILED DESCRIPTION OF SPECIFIC EMBODIMENTS

Various embodiments of the present invention provide systems and methods for reducing and/or eliminating unsolicited e-mails (e.g., spam), and act as an e-mail vouching system. Implementation and compliance with some embodiments of the e-mail vouching system and method may be voluntary (at the user, computer system, and/or local network level) on the part of both the e-mail recipient and the e-mail sender/originator. Specific embodiments hold an incoming e-mail message within a holding unit (e.g., a holding database or other storage facility designated for that purpose), and send an e-mail to the sender requesting that the sender confirm and verify that it did, in fact, send the e-mail. Details of illustrative embodiments are discussed below.

FIG. 1 shows one embodiment of a method in accordance with the present invention. According to the method 100, a user that supports various embodiments of the e-mail vouching system described herein receives an e-mail from a sender (Step 110). Although, any number of message formats are supported by various embodiments of the present invention, in some embodiments, the message originator (e.g., the sender) may indicate that it supports the e-mail vouching system by adding a header to the outgoing email (e.g., the e-mail sent to the recipient). For example, the e-mail message sent by the originator may include the following header information:

Vouchmail-originator: webxyz.mail.sub.vmoriginator.com (xxx.xxx.206.116)

In the above header information, "webxyz.mail.sub.vm-originator.com" corresponds to the name of the originating node and "xxx.xxx.206.116" is the internet protocol (IP) address of the originating node (e.g., the sending computer). As mentioned, above, by placing this header in the email, the originator (e.g., sender) confirms that it supports the e-mail vouching system/method and is able to receive a confirmation response request (discussed in greater detail below), for example, in the form of an email directed to the email address:

vouchmail@webxyz.mail.sub.vmoriginator.com

Upon receipt of the e-mail, the system/method 100 can determine if the e-mail contains header information indicating that the sender supports the e-mail vouching system/method. If the e-mail includes the header information, the method may, prior delivering the e-mail message to the recipient's (e.g., addressee's) e-mail inbox, hold the e-mail message within a holding unit (e.g., a holding database or other storage facility designated for that purpose) (Step 120) during the e-mail verification/vouching process. If the e-mail does not include the proper header information indicating support, the method may perform an action with respect to the e-mail (discussed in greater detail below and shown in Table 1).

In addition to the header confirming support of the e-mail vouching system, the originator may also include a standard message id header in the e-mail. For example, the message may include the header "Message-ID: <0167$b564a200$202de600$@com>," where "<0167$b564a200$202de600$@com>" is a unique identifier for the message chosen by the originator.

Once the e-mail vouching system/method has received the incoming message from the originator and the message is stored within the holding unit, the e-mail vouching system/method 100 may send a confirmation response request e-mail to the originator/sender of the original message (Step 130). As discussed in greater detail below, the confirmation response request e-mail can include the type of confirmation response (e.g., the type of confirmation code) that is being requested by the recipient, ISP, and/or the e-mail vouching system. Additionally, the confirmation response request e-mail can also include the following header information.

Confirmation Response Request E-Mail Header Information

Vouchmail-recipient: mail.sub.vmrecipient.com (xxx.xxx.261.112)
Vouchmail-jurisdiction: "plain text declaration of the recipient's applicable legal jurisdiction"
Vouchmail-ID: <0167$b564a200$202de600$@com>
Vouchmail-confirmation-type: X <kddo9232k89sfdiw9243>

In the above header information, mail.sub.vmrecipient.com (xxx.xxx.261.112) is the name of the receiving node, "xxx.xxx.261.112" is the IP address of the receiving node (e.g., the system receiving the e-mail), "<0167$b564a200$202de600$@com>" is the Message-ID specified by the message originator in the header of the original message, "X" specifies the type of confirmation response requested by the e-mail vouching system, and "kddo9232k89sfdiw9243" is an optional arbitrary string of characters chosen by the e-mail vouching system (explained in greater detail below). By placing the above header information in the email, the e-mail vouching system indicates that it is able to receive a confirmation in the form of an email (e.g., an e-mail response to the confirmation response request e-mail).

After sending the confirmation response request e-mail, the e-mail vouching system may then continue holding the e-mail in the holding unit until a confirmation e-mail is received from the originator of the original e-mail message (Step 140). The originator may send the confirmation e-mail (e.g., the response to the confirmation response request e-mail) to the recipient or an e-mail address specifically for the e-mail vouching system, for example, vouchmail@mail.sub.vmrecipient.com. If the method/system does not receive a confirmation e-mail from the sender, the method 100 may perform an action with respect to the e-mail (discussed in greater detail below and shown in Table 1).

The confirmation e-mail may include the following header information

Confirmation E-Mail Header Information

Vouchmail-ID: <0167$b564a200$202de600$@com>
Vouchmail-confirmation-code: 39a8f931ac984bae In the above confirmation e-mail header information, "<0167$b564a200$202de600$@com>" may be the Message-ID specified by the message originator in the header of the original message, and "39a8f931ac984bae" may be the requested confirmation code.

Alternatively, instead of responding with the requested confirmation code, the originator may include one or more other codes within the confirmation e-mail. For example, if the originator would like to instruct the e-mail vouching system to disregard the original e-mail (e.g., treat the e-mail as if it was never sent), the originator can include a cancel code (e.g., "<CANCEL>") within the confirmation e-mail. Additionally or alternatively, if the originator did not send the original e-mail message, the originator can include a deny code (e.g., "<DENY>"), which indicates that the originator did not originate the original e-mail message and/or that the message was fraudulently originated by another party.

If a confirmation e-mail is received, the e-mail vouching system may analyze the confirmation e-mail to determine whether or not the message includes the correct confirmation code (Step 150). If the confirmation e-mail includes the correct confirmation code (e.g., if the purported message originator accepts responsibility for sending the message and/or accepts the legal jurisdiction specified in the confirmation response request e-mail), the e-mail vouching system may then perform a first action (Step 160). Alternatively, if the confirmation e-mail does not include the correct confirmation code (e.g., the original e-mail message is likely to be spam), or includes a cancel or deny code, the e-mail vouching system may then perform a second action (Step 170). The action that the e-mail vouching system takes after receiving a correct confirmation code, incorrect confirmation code, no confirmation code, deny code, or cancel code may be at the discretion of the recipient and/or ISP (e.g., the recipient and/or ISP can decide which action to take in response to the confirmation response request e-mail), and may be predetermined (e.g., it may be determined during the initial set-up/implementation of the e-mail vouching system).

Additionally, the recipient and/or ISP may also determine which action(s) to take if the original e-mail message does not contain the header information that indicates that the originator complies with the e-mail vouching system. Table 1 shows a number of exemplary actions that may be performed in response to the confirmation e-mail (or the original e-mail if it does not include the header information indicating compliance with the vouching system). However, it is important to note, that this list is not exhaustive and additional actions are within the scope of this invention.

TABLE 1

LIST OF POSSIBLE ACTIONS

|  | ignore and delete | add vouchmail result to header info | transfer to filtering software | deliver to final addressee | apply for micropayment | log for referral of complaint for investigation or prosecution | comply with sender request |
|---|---|---|---|---|---|---|---|
| no vouchmail response | x | x | x | x |  |  |  |
| incorrect vouchmail response | x | x | x | x |  | x |  |
| correct vouchmail response |  | x | x | x | x |  |  |
| vouchmail denial | x | x |  |  |  | x | x |
| vouchmail cancel | x | x | x | x |  |  | x |

In order to prevent an originator/spammer from adjusting the contents of each outgoing email message in such a way that the correct confirmation-code would be the same for every message (or for a large subgroup of messages in a batch of outgoing spam), some embodiments of the present invention can request a number of different confirmation codes from the message originator. For example, each recipient and/or ISP (via the e-mail vouching system) can request one or more specific confirmation codes within the confirmation response request e-mail. Table 2 includes a list of exemplary confirmation code types that a recipient/ISP may request in the confirmation response request e-mail. It is important to note that that type of confirmation code (e.g., 0, 1, 2, 3, 4, etc.) corresponds to the "X" in the confirmation response request e-mail header discussed above. Additionally, it is also important to note that Table 2 includes only a partial list of the potential confirmation code types. Additional confirmation code types may be within the scope of this invention.

TABLE 2

EXEMPLARY LIST OF CONFIRMATION CODE TYPES

| Type | Name | Description |
|---|---|---|
| 0 | null | No code computed. Proper response for every message is "0" |
| 1 | CRC8 | 8 bit cyclic redundancy check |
| 2 | CRC32 | 32 bit cyclic redundancy check |
| 3 | XOR8 | 8 bit exclusive or redundancy check |
| 4 | XOR16 | 16 bit exclusive or redundancy check |

As discussed in greater detail below, each of the redundancy checks listed in Table 2 can include an initial redundancy check and a final redundancy check, and may be performed on the full body or a portion of the full body of the original e-mail message (e.g., the original e-mail message sent by the originator) or the confirmation response request e-mail, and/or the header information of either of the e-mail messages. For example, the originator may perform the initial redundancy check on the header information of the original message, and perform the final redundancy check on some of the header information of the confirmation response request e-mail. Table 3 shows an exemplary list of header information on which the initial redundancy check and final redundancy check may be performed.

TABLE 3

HEADER INFORMATION FOR REDUNDANCY CHECK

| Initial Redundancy Check | Final Redundancy Check |
|---|---|
| To: | Date: of the confirmation response request email |
| From: | Vouching System Jurisdiction: |
| Subject: | Confirmation Code Type: (including the arbitrary character string, if provided) |
| Cc: |  |
| Date: |  |
| Message-ID: |  |
| Reply-to: (if exists) |  |

The exact implementation of the redundancy checks may be left to the discretion of the system administrator or software provider. Additionally, the message originator may compute the "initial" redundancy check at the time the message is sent and store the result in a look-up table indexed by Message-ID. Alternatively, the originator may compute the "initial" redundancy check at the time it is requested by the recipient using a locally stored copy of the outgoing message. Once the originator receives the confirmation response request e-mail, the originator may then update the "initial" redundancy check to yield the "final" redundancy check by incorporating the information in the additional fields listed within Table 3, above. The e-mail vouching system may compute the "final" redundancy check at the time the confirmation response request e-mail is generated/sent and can store the result in a look up table indexed by Message-ID. Once the e-mail vouching system receives the confirmation response from the message originator, the e-mail vouching system may then compare the redundancy check result in the look-up table with the confirmation response received from the message originator.

As mentioned above, embodiments of the present invention do not limit the e-mail recipient and/or e-mail vouching system from initiating more than one confirmation code request for a given message. To that end, the recipient and/or e-mail vouching system may initiate a plurality of requests for a given message, independently varying the confirmation-code-type for each request (e.g., for each confirmation response request e-mail). Alternatively, the recipient and/or e-mail vouching system may request multiple confirmation code types within a single confirmation response request e-mail.

The communication between the message originator and the e-mail vouching system may also be used to communicate auxiliary information or to establish additional contractual relationship(s) between the message recipient and the message originator. For example, the e-mail vouching system could include additional fields in its confirmation response request e-mail (e.g., the recipient's request for a confirmation code) to request or require that the message originator agree to make a payment (either a substantial amount, or a micropayment) to the e-mail vouching system and/or ISP as a condition of the recipient consenting to accept the message and deliver it to the recipient/addressee. The payment amount and method (for example, a specific micropayment facility) could be communicated and mutually agreed to in parallel with the basic e-mail vouching system exchanges discussed above (e.g., the confirmation response request e-mail and the confirmation e-mail).

As mentioned above, one problem with the enforcement of anti-spam laws is the lack of legal jurisdiction. The courts within the jurisdiction of the recipient often lack personal jurisdiction over the non-resident spammer. Various embodiments of the present invention solve this problem. For example, the jurisdiction of the email vouching system or of the e-mail recipient may be the applicable legal jurisdiction specified by the message recipient. In some embodiments, the message recipient, ISP, and/or e-mail vouching system can also require, as a condition of accepting a message that is compliant with the e-mail vouching system, that the message originator agree to be bound by the laws of the specified jurisdiction. The message originator can acknowledge its agreement by actively complying with the e-mail vouching method. In other words, by implementing/incorporating various embodiments of the present invention, the recipient, ISP, and/or e-mail vouching system can establish an explicit agreement regarding the applicable legal jurisdiction (e.g., for disputes arising out of the e-mail message) with the e-mail message originator. In this manner, embodiments of the present invention provide an essential means for establishing and enforcing legal accountability on the email originator. If the originator violates the anti-spam laws of the applicable jurisdiction, or if the originator is engaging in deceptive or fraudulent practices, the crucial matter required to permit prosecution, establishment of legal jurisdiction over the originator, is provided for.

It is important to note that some embodiments of the present invention can establish legal jurisdiction, even if the message originator does not respond with a correctly calculated confirmation code. For example, some embodiments may require that the message originator agree to the applicable legal jurisdiction as a condition of using the e-mail vouching system and method. Therefore, in such embodiments, the act of responding to the confirmation response request e-mail, with or without a correct confirmation code, is sufficient to establish a binding contract (e.g., establish legal jurisdiction) between the originator and the recipient, ISP, and/or e-mail vouching system.

Various embodiments of the present invention can greatly reduce the volume of spam that is not only received by a given recipient, but also sent by spammers. For example, embodiments of the present invention significantly increase the costs associated with the origination of spam by (1) adding major impediments to the misappropriation of unsecured open relays, (2) making it significantly more difficult for spammers to use undetected malicious software to misappropriate others' computers in a botnet, (3) denying spammers anonymity, (4) establishing enforceable legal jurisdictions, and (5) contemplating an individualized response based on the content of each e-mail message. Therefore, widespread adoption of various embodiments of the present invention will create a dramatic reduction in the total amount of spam on the internet, while allowing private parties and the authorities to hold spammers legally accountable for violations of law and for criminal penalties and civil damages.

Furthermore, with its voluntary, individualized approach to grass roots adoption, various embodiments of the e-mail vouching system and method described herein, are completely compatible with the general internet culture which, in turn, will enhance its rate and degree of adoption. The information which embodiments of the present invention make available to the recipient, ISP, and/or e-mail vouching system can, at the recipient's, ISP's, and/or e-mail vouching system's discretion, be used directly by the e-mail vouching system to decide how to handle an incoming email. Additionally or alternatively, the information may be sent to the recipient's spam filtering software to enable that software to perform more effectively.

The additional internet message traffic caused by the confirmation response request e-mails and confirmation e-mails will be offset many fold by the dramatic reduction in the amount of spam circulating over the internet. Additionally, the additional computational and storage overhead required by message originators and recipients/ISPs will be repaid many times over by the reduction in demand on hardware and software as spam traffic declines. This additional overhead will also be repaid many times over, aggregated across the community, by the reduction in fraud and deceptive practices perpetrated via email by spammers as well as by the reduction in invasions and misappropriations of recipients'/ISPs' hardware, privacy, and intellectual property by malicious software which is currently be circulated by unscrupulous spammers.

It should be appreciated that various embodiments of the present invention are compatible with existing filtering and screening software, and may be used in conjunction with such software to improve the effectiveness. Additionally, embodiments of the present invention may be user configurable such that the user can balance rigor vs. effectiveness, and determine which actions to perform based upon the e-mail responses (e.g., the confirmation e-mails) received in response to the confirmation response requests.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An e-mail vouching system for reducing unsolicited e-mails comprising:
a message receiving unit configured to receive an at least one e-mail message from a sender to a recipient, each of the at least one e-mail messages including a header indicating that the sender supports the e-mail vouching system, wherein the sender's support of the email vouching system creates an explicit agreement regarding a legal jurisdiction governing any dispute arising out of the e-mail, the governing legal jurisdiction being the legal jurisdiction of the recipient;
a storage device configured to store each of the at least one e-mail messages received by the message receiving unit;
a confirmation response request generator configured to generate and send a confirmation response request e-mail to the sender in response to each of the at least one e-mail messages from the sender, the confirmation response request e-mail including (1) a request for at least one confirmation code as calculated by one or more confirmation code calculation methods specified by the e-mail vouching system and contained within the confirmation response request e-mail, and (2) confirmation response request e-mail data; and a message analyzer configured to analyze a confirmation e-mail received in the message receiving unit, the confirmation e-mail being sent from the sender in response to the confirmation response request e-mail, the message analyzer configured to analyze the confirmation e-mail to determine if the confirmation e-mail includes a correct confirmation code calculated according to the one or more confirmation code calculation methods specified within the confirmation response request e-mail and based, at least in part, on the confirmation response request e-mail data, the e-mail vouching system configured to perform a first action with respect to the at least one e-mail message if the message analyzer determines that the confirmation e-mail includes the correctly computed code, the e-mail vouching system configured to perform a second action with respect to the at least one e-mail message if the message analyzer determines that the confirmation e-mail does not include the correctly computed code.

2. An e-mail vouching system according to claim 1, wherein the first action is pre-determined by at least one of the recipient, the recipient's internet service provider, and the e-mail vouching system, and includes at least one selected from the group consisting of: delivering the e-mail message to the recipient, transferring the e-mail message to a filtering software, adding a confirmation e-mail result to the header, and notifying the recipient that the e-mail message is stored within the storage device.

3. An e-mail vouching system according to claim 1, wherein the second action is pre-determined by at least one of the recipient, the recipient's internet service provider, and the e-mail vouching system, and includes at least one selected from the group consisting of: deleting the e-mail message, transferring the e-mail message to a filtering software, adding a confirmation e-mail result to the header, and notifying the recipient that the e-mail message is stored within the storage device.

4. An e-mail vouching system according to claim 1, wherein the at least one confirmation code calculation method includes at least one selected from the group consisting of a null code, an 8 bit cyclic redundancy check, a 32 bit cyclic redundancy check, an 8 bit exclusive or redundancy check, and a 16 bit exclusive or redundancy check.

5. An e-mail vouching system according to claim 1, wherein the confirmation e-mail includes the code within the header information.

6. An e-mail vouching system according to claim 5, wherein the confirmation e-mail header information also includes a message ID corresponding to the at least one e-mail message.

7. An e-mail vouching system according to claim 1, wherein the confirmation response request e-mail includes header information that indicates the e-mail vouching system is able to receive the confirmation e-mail.

8. An e-mail vouching system according to claim 1, wherein the confirmation response request e-mail further includes the legal jurisdiction within a header of the confirmation response request e-mail.

9. An e-mail vouching system according to claim 8, wherein the confirmation e-mail established the sender's agreement to the legal jurisdiction.

10. An e-mail vouching system according claim 9, wherein the code correctly computed according to the one or more confirmation code calculation methods establishes the sender's agreement to the legal jurisdiction.

11. An e-mail vouching system according to claim 1, wherein the at least one e-mail from a sender is sent from a sending computer.

12. An e-mail vouching system according to claim 11, wherein the sending computer is configured to perform an initial redundancy check on the e-mail message prior to sending the e-mail message to the recipient, and store a sender initial redundancy check result in a sender look-up table.

13. An e-mail vouching system according to claim 11, wherein the sending computer is configured to perform a sender final redundancy check in response to the confirmation response request e-mail, the sender final redundancy check creating a sender final redundancy check result corresponding to the at least one confirmation code calculation methods.

14. An e-mail vouching system according to claim 13, wherein the sending computer is further configured to perform the final redundancy check on at least part of the confirmation response request e-mail.

15. An e-mail vouching system according to claim 1, wherein the e-mail vouching system is configured to perform an e-mail vouching system final redundancy check prior to receiving the confirmation e-mail, the e-mail vouching system configured to store an e-mail vouching system final redundancy check result in an e-mail vouching system look-up table.

16. An e-mail vouching system according to claim 15, wherein the message analyzer is configured to compare the e-mail vouching system final redundancy check result within the e-mail vouching system look-up table with the code within the confirmation response.

17. An e-mail vouching system according to claim 1, wherein the confirmation response includes a cancel message if the sender would like the e-mail vouching system to cancel the e-mail message.

18. An e-mail vouching system according to claim 1, wherein the confirmation response includes a deny message if the sender wishes to deny that it originated the e-mail message.

19. An email vouching system according to claim 1, wherein the e-mail vouching system is configured to perform a third action if a confirmation e-mail from the sender is not received in response to the confirmation response request e-mail, the third action being at least one selected from the group consisting of: deleting the e-mail message, transferring the e-mail message to a filtering software, adding a confirmation e-mail result to the header, and notifying the recipient that the e-mail message is stored within the storage device.

* * * * *